US009959730B2

(12) United States Patent
Spikes

(10) Patent No.: US 9,959,730 B2
(45) Date of Patent: May 1, 2018

(54) LOCATION TRACKING SYSTEM

(71) Applicant: Caline Spikes, Waco, TX (US)

(72) Inventor: Caline Spikes, Waco, TX (US)

(*) Notice: Subject to any disclaimer, the term of this patent is extended or adjusted under 35 U.S.C. 154(b) by 0 days. days.

(21) Appl. No.: 15/133,320

(22) Filed: Apr. 20, 2016

(65) Prior Publication Data
US 2017/0084149 A1   Mar. 23, 2017

Related U.S. Application Data

(60) Provisional application No. 62/222,266, filed on Sep. 23, 2015.

(51) Int. Cl.
*G08B 21/02* (2006.01)
*H04W 4/02* (2018.01)
*G08B 15/00* (2006.01)

(52) U.S. Cl.
CPC ....... *G08B 21/0261* (2013.01); *G08B 15/005* (2013.01); *H04W 4/023* (2013.01)

(58) Field of Classification Search
CPC ... G08B 21/02; G08B 21/0261; G08B 21/088
See application file for complete search history.

(56) References Cited

U.S. PATENT DOCUMENTS

| 5,396,227 | A | 3/1995 | Carroll et al. |
| 5,892,447 | A | 4/1999 | Wilkinson |
| 6,198,390 | B1 * | 3/2001 | Schlager ............... B63C 9/0005 340/539.1 |
| 6,850,163 | B1 | 2/2005 | Adamczyk et al. |
| 7,098,795 | B2 | 8/2006 | Adamczyk et al. |
| 8,831,627 | B2 | 9/2014 | Aninye et al. |
| 2005/0287981 | A1 * | 12/2005 | Hill ........................ H04M 1/67 455/404.1 |
| 2012/0268269 | A1 | 10/2012 | Doyle |
| 2014/0077947 | A1 * | 3/2014 | Lee ........................ G06Q 10/00 340/539.13 |
| 2015/0061864 | A1 * | 3/2015 | Buck, Jr. ............ G08B 21/0269 340/539.13 |

* cited by examiner

*Primary Examiner* — Curtis Odom
(74) *Attorney, Agent, or Firm* — Global Intellectual Property Agency, LLC; Jordan Sworen

(57) ABSTRACT

A location tracking system for allowing a user to monitor the location of an abuser who has been issued a restraining order. The tracking system includes a monitoring unit to be carried by the user that is in wireless communication with a monitored unit to be worn by the abuser. The monitoring unit includes a housing having a display screen thereon, wherein the display screen shows the location of the monitoring unit and the location of the monitored unit. The monitoring unit is configured to determine the distance of separation between the monitoring unit and monitored unit. The monitoring unit includes an alarm unit that will produce an audible alert if the distance of separation drops below a predetermined minimum distance.

7 Claims, 3 Drawing Sheets

LOCATION TRACKING SYSTEM

CROSS REFERENCE TO RELATED APPLICATION

This application claims the benefit of U.S. Provisional Application No. 62/222,266 filed on Sep. 23, 2015. The above identified patent application is herein incorporated by reference in its entirety to provide continuity of disclosure.

BACKGROUND OF THE INVENTION

Field of the Invention

The present invention relates to tracking systems. More specifically, the present invention provides a location tracking system adapted for use in allowing a user having a monitoring unit to determine the location of a person carrying a monitored unit.

Restraining orders are often issued to protect a victim of domestic violence, harassment, stalking, or assault from being contacted by another person, hereinafter referred to as the abuser. The restraining order often specifies that the abuser must maintain a specified distance from the victim, the victim's home, or the victim's workplace. Victims may also request that the abuser be prohibited from having contact with the victim such that the abuser cannot call or email the victim, or send the victim deliveries or gifts.

While restraining orders are intended to prevent future incidents of harassment from occurring, restraining orders can be very difficult to enforce in practice. The police or local authorities do not have the ability to constantly track the location of the abuser and to ensure the abuser maintains the specified distance from the victim as stated in the restraining order. Similarly, the victim may not have knowledge of the abuser's location and will not know if the abuser is in the nearby area. As a result, the victim may still be fearful that the abuser is following him or her or that the victim may encounter the abuser. This is particularly problematic in circumstances where the victim and abuser live in the same city or town and are thus likely to travel to similar locations.

Without knowing the location of the abuser, the victim may not feel safe or comfortable and may fear that the abuser is violating the terms of the restraining order. The victim would then have to report the violation of the restraining order after already encountering the abuser. At this point, the victim may have suffered another incidence of abuse and may suffer great distress from encountering the abuser. Thus, a device for allowing the victim to have knowledge of the location of the abuser is desired in order to prevent such encounters from occurring.

Devices have been disclosed in the prior art that relate to tracking and monitoring devices. These include devices that have been patented and published in patent application publications. These devices generally relate to tracking and monitoring devices for detecting the location of a specific person or persons, such as U.S. Pat. No. 5,396,227, U.S. Pat. No. 6,850,163, U.S. Pat. No. 5,892,447, and U.S. Pat. No. 8,831,627, U.S. Published Patent Application Number 2012/0268269, and U.S. Pat. No. 7,098,795.

These prior art devices have several known drawbacks. The devices in the prior art fail to provide an alarm unit that creates an audible alert for the abuser and for the user in order to indicate to both parties that the predetermined distance set forth in a restraining order has been violated. Further, the prior art devices fail to include a monitored unit comprising an ankle bracelet with an electroshock mechanism therein adapted to deliver an electric shock to the abuser.

In light of the devices disclosed in the prior art, it is submitted that the present invention substantially diverges in design elements from the prior art and consequently it is clear that there is a need in the art for an improvement to existing location tracking systems. In this regard the instant invention substantially fulfills these needs.

SUMMARY OF THE INVENTION

In view of the foregoing disadvantages inherent in the known types of location tracking systems now present in the prior art, the present invention provides a new location tracking system wherein the same can be utilized for providing convenience for the user when monitoring the location of an abuser who has been issued a restraining order.

The tracking system comprises a monitoring unit to be carried by the user and a monitored unit to be worn by the abuser who has received a restraining order. The monitored unit includes a display having an interface thereon, wherein the interface shows the location of the monitoring unit and the location of the monitored unit. The monitored unit comprises an ankle bracelet having a GPS chip adapted to communicate with the monitoring unit in order to transmit location information thereto. The monitored unit further includes an electroshock mechanism adapted to provide an electric shock to stun or slow the abuser to prevent the abuser from harassing or pursuing the user.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
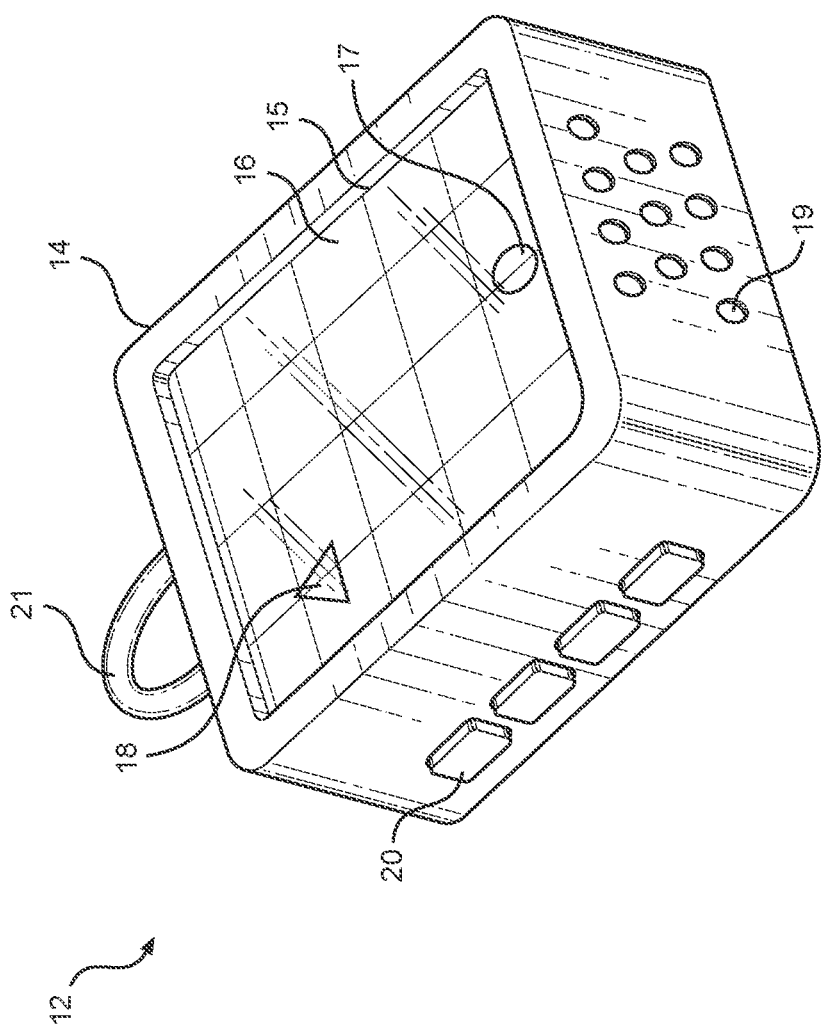
FIG. 1 shows a perspective view of the monitoring unit of the location tracking system.

Reference is made herein to the attached drawings. Like reference numerals are used throughout the drawings to depict like or similar elements of the location tracking system. For the purposes of presenting a brief and clear description of the present invention, the preferred embodiment will be discussed as used for tracking the location of an abuser who has been issued a restraining order. The figures are intended for representative purposes only and should not be considered to be limiting in any respect.

Referring now to FIG. 1, there is shown a perspective view of the monitoring unit and the monitored unit of the tracking system. The tracking system comprises a monitoring unit 12 to be carried by the victim/user and a monitored unit 31 adapted to be worn by the abuser/abusers. The monitoring unit 12 and the monitored unit 31 are in wireless communication with one another. Any of various modes of wireless communication may be used, and it is not desired to limit the specific method of wireless communication.

The monitoring unit 12 comprises a housing 14 having a display screen 15 thereon. The display screen 15 includes a user interface 16 that preferably displays a map thereon. The monitoring unit 12 includes a GPS chip to determine the location thereof, or may include other similar means for determining the location thereof. The monitoring unit location 17 is displayed on the map and the monitored unit location 18 is also displayed on the map. The monitoring unit 12 is further adapted to determine the distance of separation between the monitoring unit 12 and the monitored unit 31. The distance of separation is computed as a straight line distance between the monitoring unit 12 and the monitored unit 31. Preferably, the monitoring unit location 17 is shown by a first symbol, such as a circle, and the monitored unit location 18 is shown by a second symbol, such as a triangle, or a differently colored circle. This allows the user to determine if the abuser is in a nearby area so that the user can avoid encountering the abuser without the abuser having knowledge of the user's location. Further, displaying the abuser's location allows the user to determine how to travel in a direction that avoids or moves away from the abuser.

In some embodiments, the monitored unit location 18 is not displayed if the monitored unit 31 exceeds a predetermined maximum distance from the monitoring unit location 17. For example, if the predetermined maximum distance is twenty miles, and the abuser is located thirty miles from the user, the abuser's location will not be displayed on the map. The user is concerned with determining the abuser's location if he or she is in the nearby area and the user does not need to determine the abuser's location at excessive distances, such as when the abuser is traveling out of state.

The monitoring unit 12 further includes one or more controls 20 thereon that are adapted to allow the user to manipulate and operate the interface 16. The controls 20 preferably comprise push-buttons that can be depressed with the user's fingertips. The controls 20 are located on the sides of the housing 14 in the illustrated embodiment. However, in some embodiments, the controls 20 may include a touch screen control such that the user can touch the display screen 16 in order to manipulate the user interface. The controls 20 may allow the user to zoom in and out on the map so as to enlarge a specific area. Further, the controls 20 may allow the user to turn the device on and off. The controls 20 may also control the volume of an alarm unit 19 of the monitoring unit 12.

The monitoring unit 12 further comprises an alarm unit 19 having a speaker that produces an audible alert. The alarm unit 19 is adapted to produce an audible alert if the distance of separation drops below a predetermined minimum distance. The predetermined minimum distance preferably corresponds to the distance stated in the restraining order issued to the abuser. The audible alert may include a repeating tone, a siren, or a series of various sounds. In some embodiments, the alarm unit 19 further includes a vibration motor to provide a vibratory alert which may be desirable if the user is inside of a quiet location, such as a library, a church, or a workplace.

The monitoring unit 12 is preferably compact so that it can be easily transported by the user. The housing 14 may have a rectangular configuration with a shallow depth. In some embodiments, the monitoring unit 12 includes a key ring 21 thereon in some embodiments so as to allow the user to connect the monitoring unit 12 on a keychain. This allows the user to keep the monitoring unit 12 on hand at all times.

Figure 2:
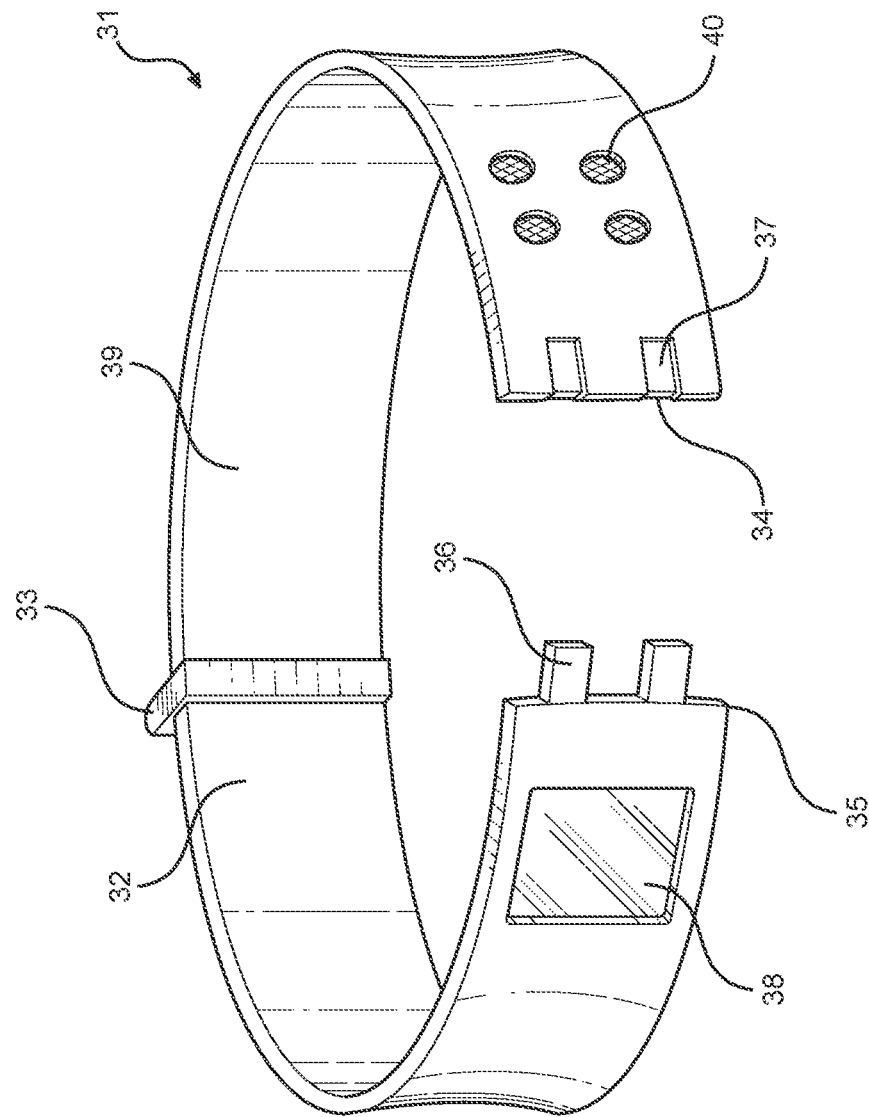
FIG. 2 shows a perspective view of an embodiment of the monitored unit of the location tracking system.

Referring now to FIG. 2, there is shown a perspective view of an embodiment of the monitored unit of the location tracking system. The monitored unit 31 is adapted to be worn on the body of the abuser. In the illustrated embodiment, the monitored unit 31 comprises an ankle bracelet. The ankle bracelet includes a strap 32 adapted to encircle the user's ankle. The ankle bracelet preferably includes a locking mechanism 39 thereon for securing the ankle bracelet in place on the abuser's ankle such that the abuser cannot remove the same. The leading end 34 of the strap 32 is adjustably securable to the locking mechanism 39 for securing the strap 32 tightly on the abuser's ankle. In this embodiment, the locking mechanism 39 is adapted to engage with an aperture 35 on the strap 32, wherein the strap 32 comprises a series of spaced apertures 35 for engagement with the locking mechanism 39. The locking mechanism 39 may include a protrusion adapted to removably engage with an aperture 35 on the strap 32.

The monitored unit 31 further includes an alarm unit 40 thereon. The alarm unit 40 includes a speaker adapted to produce an audible alert, similar to the alarm unit of the monitoring unit. The alarm unit 40 produces an audible alert when the abuser has breached the predetermined minimum distance as set by the restraining order. The alarm unit 40 notifies the abuser that he or she has traveled too close to the user and allows the abuser to take corrective measures to maintain the mandated degree of separation.

In some embodiments, the monitored unit 31 also includes an electroshock mechanism 38. The electroshock mechanism 38 includes one or more prongs 36 adapted to engage the body of the user, and the electroshock mechanism 38 is adapted to create an electric shock or pulse to stun or slow the abuser. The electroshock mechanism 38 automatically administers an electric shock if the distance of separation drops below a predetermined safety distance. The predetermined safety distance is lower than the predetermined minimum distance. Thus, if the user has breached the restraining order distance the alarm will sound, but if the abuser continues to travel closer towards the user and breaches the safety distance, the electroshock mechanism 38 is adapted to deliver an electric shock.

In alternate embodiments, the electroshock mechanism 38 is wirelessly controlled via a remote unit. The remote unit is preferably operated by local authorities, such as the police. This allows the police to administer an electric shock to the abuser if it is deemed necessary to do so in order to protect the user and to allow the user to avoid an altercation with the abuser.

Figure 3:
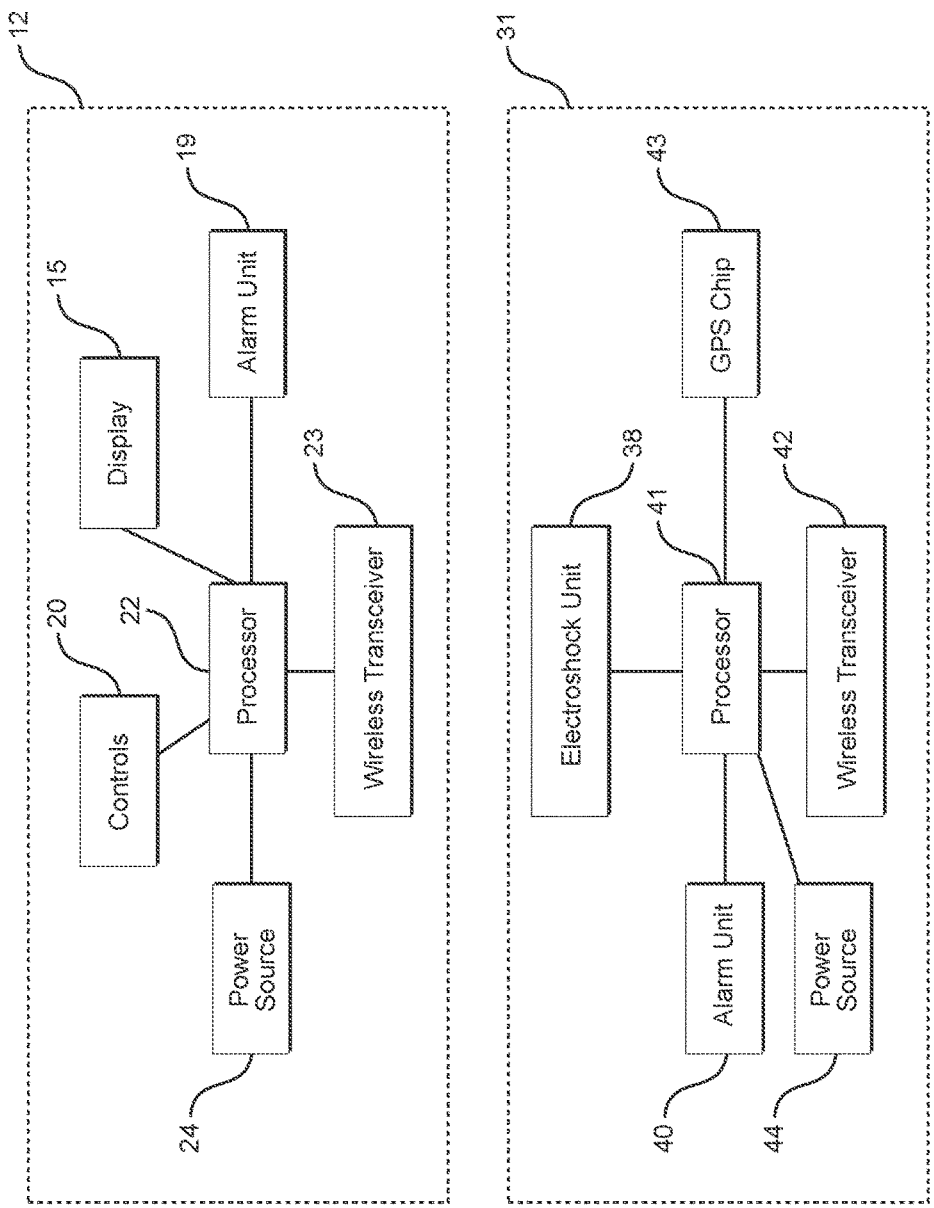
FIG. 3 shows a schematic diagram of the components of the location tracking system.

Referring now to FIG. 3, there is shown a schematic diagram of the components of the location tracking system. The monitoring unit 12 comprises a wireless transceiver 23 adapted to wirelessly communicate with a wireless transceiver 42 of the monitored unit 31. The wireless transceiver 23 is electrically connected to a processor 22 that outputs the location information received by the wireless transceiver 23 onto the display 15. The processor 22 further determines if the distance of separation between the monitored unit 31 and the monitoring unit 12 in order to determine if a predetermined minimum distance has been breached. The processor 22 is further connected to the alarm unit 19 and is adapted to cause the alarm unit 19 to activate if the predetermined minimum distance has been breached. The monitoring unit 12 further comprises a power source 24, such as one or more rechargeable batteries for providing power to the unit. Further, one or more controls 20 are provided wherein the controls 20 are adapted to allow the user to control operation of the monitoring unit 12 and adjust the settings thereof, such as by allowing the user to manipulate the interface and map thereon, adjust the volume settings, and turn the monitoring unit 12 on and off.

The monitored unit 31 comprises a wireless transceiver 42 adapted to communicate with the wireless transceiver 23 of the monitoring unit 12. The monitored unit 31 may receive a signal from the monitoring unit 12 when the monitoring unit 12 has determined the abuser has breached the predetermined minimum distance of separation, wherein an alarm unit 40 in the monitored unit 31 will produce an audible alert. The wireless transceiver 42 is electrically connected to a processor 41 that coordinates the operation of the monitored unit 31. The monitored unit 31 further includes a GPS chip 43 adapted to determine the location of the monitored unit 31, which is then transmitted to the monitoring unit 12 via the wireless transceiver 42 of the monitored unit 31. If the abuser exceeds the predetermined minimum distance and travels close enough to the user to also breach a predetermined safety distance, an electroshock unit 38 operably connected to the processor 41 will be actuated, delivering an electric shock to the abuser. The monitored unit 31 further includes a power source 44 for powering the unit.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A location tracking system, comprising:
    a monitoring unit adapted to be carried by a user, wherein the monitoring unit is in wireless communication with a monitored unit adapted to be worn by an abuser;
    wherein the monitoring unit comprises a housing having a display adapted to display a user interface thereon, wherein said user interface comprises a map on which a location of the monitoring unit is displayed and on which a location of the monitored unit is displayed;
    the housing further including a key ring thereon;
    wherein the monitoring unit determines a distance of separation between the monitored unit and the monitoring unit;
    wherein the monitoring unit further comprises an alarm unit adapted to produce an audible alert when the distance of separation has dropped below a predetermined minimum distance;
    the monitored unit further comprising an alarm unit that emits an audible alert when the distance of separation has dropped below the predetermined minimum distance;
    the monitored unit further comprising an electroshock mechanism, the electroshock mechanism including two activation conditions, wherein the first activation condition is met when the distance of separation has dropped below a predetermined safety distance, wherein the predetermined safety distance is less than the predetermined minimum distance, and wherein the second activation condition is met when a wireless transceiver of the monitored unit receives an activation command from a police department via a remote control.

2. The location tracking system of claim 1, wherein the monitored unit comprises a GPS chip adapted to determine the location of the monitored unit.

3. The location tracking system of claim 1, wherein the monitoring unit comprises a microprocessor adapted to determine the distance of separation between the monitored unit and the monitoring unit.

4. The location tracking system of claim 1, wherein the monitoring unit further comprises one or more controls on the housing adapted to allow a user to manipulate the user interface.

5. The location tracking system of claim 1, wherein the monitored unit comprises an ankle bracelet.

6. The location tracking system of claim 2, wherein the distance of separation is defined as the straight-line distance between the location of the monitoring unit and the location of the monitored unit as determined by the GPS chip of the monitored unit.

7. The location tracking system of claim 1, wherein the monitoring unit comprises a wireless transceiver adapted to wirelessly communicate with a wireless transceiver of the monitored unit.

* * * * *